(12) United States Patent
Brown et al.

(10) Patent No.: US 8,943,735 B2
(45) Date of Patent: Feb. 3, 2015

(54) FISH CONTAINMENT DEVICE FOR ICE FISHING

(76) Inventors: Vincent Brown, Redby, MN (US);
Megan Brown, Redby, MN (US);
Stephanie Brown, Redby, MN (US)

( * ) Notice: Subject to any disclaimer, the term of this patent is extended or adjusted under 35 U.S.C. 154(b) by 337 days.

(21) Appl. No.: 13/594,577

(22) Filed: Aug. 24, 2012

(65) Prior Publication Data

US 2014/0053451 A1  Feb. 27, 2014

(51) Int. Cl.
*A01K 97/14* (2006.01)

(52) U.S. Cl.
USPC .......................................... 43/5; 43/4.5; 43/55

(58) Field of Classification Search
USPC ...................................... 43/5, 4.5, 55, 4, 54.1
See application file for complete search history.

(56) References Cited

U.S. PATENT DOCUMENTS

| | | | | |
|---|---|---|---|---|
| 4,747,226 A | * | 5/1988 | Todd | 43/4 |
| 4,866,872 A | * | 9/1989 | Guilbault et al. | 43/4 |
| 5,048,220 A | * | 9/1991 | Harris | 43/4 |
| 5,140,767 A | * | 8/1992 | Traut | 43/4 |
| 5,784,824 A | * | 7/1998 | Myroniuk | 43/4 |
| 6,568,120 B2 | * | 5/2003 | Smolinski | 43/5 |
| 6,684,553 B1 | * | 2/2004 | Holum | 43/4 |
| 6,694,662 B1 | * | 2/2004 | McClure | 43/4 |
| 2002/0020104 A1 | * | 2/2002 | Kolar et al. | 43/55 |

* cited by examiner

*Primary Examiner* — Christopher P Ellis
(74) *Attorney, Agent, or Firm* — Geiser Law, PLLC; Greg N. Geiser

(57) ABSTRACT

A ice fishing fish containment device for securing a caught fish within a hole for ice fishing. The device including a tubular sidewall extending the depth of the hole. The sidewall having a bracket on its lower end. A flapper having a top side with a grasping member higedly attached to the bracket, wherein the upward movement of a fish into the hole with displace flapper temporarily until the fish enters the hole clearing the height of the flapper. The flapper will then close securing the fish with the hole.

7 Claims, 5 Drawing Sheets

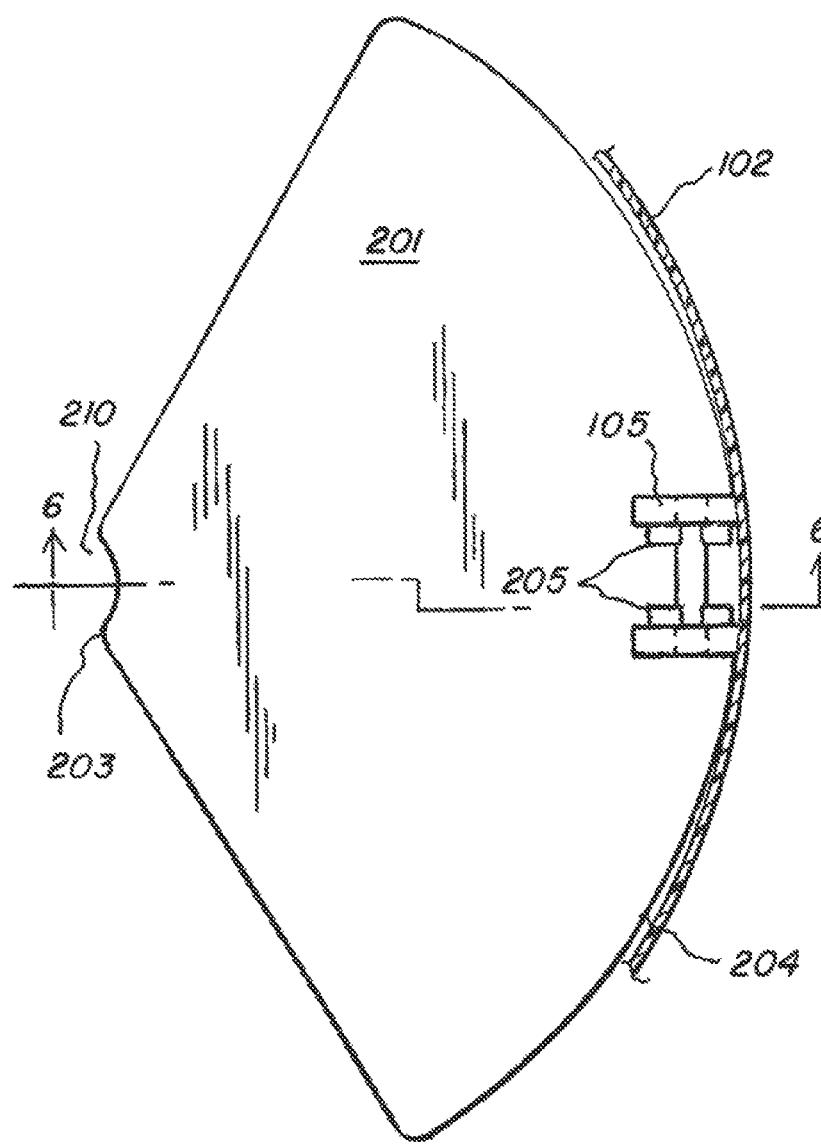
FIG. 5
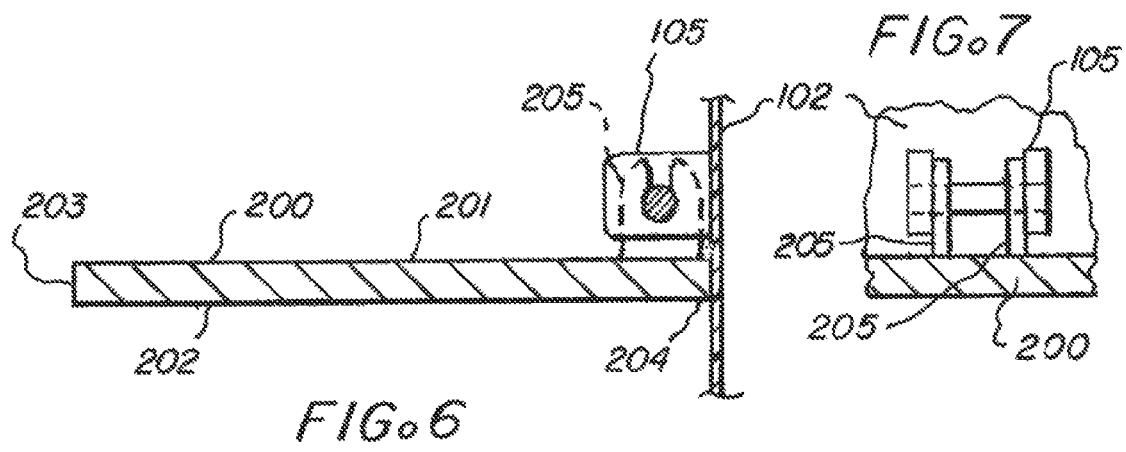
FIG. 6
FIG. 7

FISH CONTAINMENT DEVICE FOR ICE FISHING

CROSS REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The present invention relates to a device to secure a caught fish into an ice fishing hole.

BACKGROUND OF THE INVENTION

Ice fishing is popular activity in many cold climates. To ice fish an individual will bore a hole through a sheet of ice of a frozen body of water to access the unfrozen water below. After boring the hole, the individual will bait a line and fish through the hole created in the ice. A typical hole diameter for ice fishing will be between eight (8) and twelve (12) inches.

The individual will either fish over the hole using a small rod or set up a tip up. When using a rod an individual will lower the bait fishing line through the hole and into the water below. To attract fish the individual will typically jig the bait by moving the line up and down to attract fish. When using a tip up the individual baits a line and lowers it through the hole, sets the tip up and leaves the line until a fish eats the bait setting off the tip up and altering the individual they have a fish on the line.

The most frustrating thing during ice fishing is losing a caught fish within the hole. Often the most difficult part about catching the fish is maneuvering a hooked fish into and through the hole. In extremely cold climates, ice can reach thicknesses up to twenty-four (24) inches. Often times a fish will be released from the line within the hole as it thrashes and fights to be freed due to length and depth of the hole. In traditional fishing this problem is alleviated through the use of a net. As a net is not practical in ice fishing a device and method for securing a caught fish into the hole is desired.

U.S. Pat. No. 6,568,120 to Smolinski provides an ice fishing trap having a collar with a plurality of hinged gate members suspended within the ice fishing hole by a support arm including a handle that supports the device on the surface. The gates, although defining a bottom, have several gaps and openings for items to enter the water. The support arm extends upward and creates a dangerous projection when the device is adjusted to shallow depths. Further, the support arm creates an obstruction within the hole and is at risk for freezing in place within the hole.

SUMMARY

According to the present invention an ice fishing containment device is provided that secures a fish within the ice fishing hole as it is brought to the surface of the ice. Additionally, the device includes a plurality of flappers to create a substantially flat and rigid surface movable surface with only a small central aperture to secure items that may potentially be dropped into the hole.

The device includes tubular sidewall integral with the hole in the ice and defining a cavity with an open top and bottom. The sidewall has an upper end and a lower end. The upper end contains a flange with a diameter larger than the diameter of the sidewall to support the sidewall upon insertion into the hole in the ice. The flange includes a raised portion to allow a user to grasp the flange and remove the device from the hole. The lower end includes a plurality of brackets on the interior of the sidewall.

A plurality of flappers with a top side, a bottom side, a fixed end, and a free end are in communication with the lower end of the sidewall. The top side of the fixed end includes a grasping member. The grasping member attaches to the bracket and creates a hinge, wherein the flapper articulates upward with the free end moving in an arc to the fixed end. The flappers together define a bottom portion with a central lower aperture.

In an alternate embodiment, the device includes a first tubular sidewall integral with the hole in the ice and defining a cavity. The sidewall has a first upper end and a first lower end. The first upper end contains a flange with a circumference larger than the diameter of the first sidewall to support the first sidewall upon insertion into the hole in the ice. The flange includes a raised portion to allow a user to grasp the flange and remove the device from the hole. A second tubular sidewall is nested within the first sidewall. The second sidewall has a second upper end and a second lower end. The second upper end is secured to the first lower end.

The second lower end includes a plurality of brackets on the interior of the second sidewall. A plurality of flappers with a top side, a bottom side, a fixed end, and a free end are in communication with the lower end of the second sidewall. The top side of the fixed end includes a grasping member. The grasping member attaches to the bracket and creates a hinge, wherein the flapper articulates upward with the free end moving in an arc to the fixed end. The flappers together define a bottom portion with a central lower aperture.

In use, a user will place the device into a pre drilled ice fishing hole. If the alternate embodiment is used, a user will first select length of the device by moving the second sidewall to the desired depth. The user will lower their fishing line and lure through the central lower aperture to attract a fish. Upon catching the fish the user will pull the fish into the hole. Upon entering the hole, the fish will cause the flappers to articulate upward. Upon clearing the flappers, the flappers will lower and secure the hole opening, thereby preventing the fish from reentering the water and retaining the fish within the device. To retrieve the fish the user may reach in and grab the fish or easily remove the device from the hole. Additionally, the flappers will prevent the loss of items dropped into the hole as the flappers create a solid bottom with minimal gaps and only a central aperture for the lure.

Preferably the entire device is constructed out of a molded plastic due to its durability and temperature resistance. Additionally, the tubular nature of the device and the use of plastic acts as an insulator within the ice hole. This prevents the hole from freezing up during use. The flappers are easily snapped into the brackets using the grasping members. This allows for the easy replacement of flappers should one become damaged. Preferably, three flappers of equal dimensions are used as this configuration easily distributes the weight of the fish and is easily manipulated up. Additionally, the equal dimension of the flappers allows them to be universal across the device and provides for the sale of replacement flappers should they become damaged.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein:

FIG. 4A is cross sectional view of the additional embodiment of the device along the plane 4A-4A of FIG. 4, according to the present invention;

FIG. 5 is a top view of the retaining member of the device, according to the present invention;

FIG. 6 is a side view of the engagement of the retaining member and the sidewall of the device along the plane 6-6 of FIG. 5, according to the present invention; and FIG. 7 is a front view of the engagement of the retaining member and the sidewall of the device, according to the present invention.

DETAILED DESCRIPTION OF THE INVENTION

Figure 1:
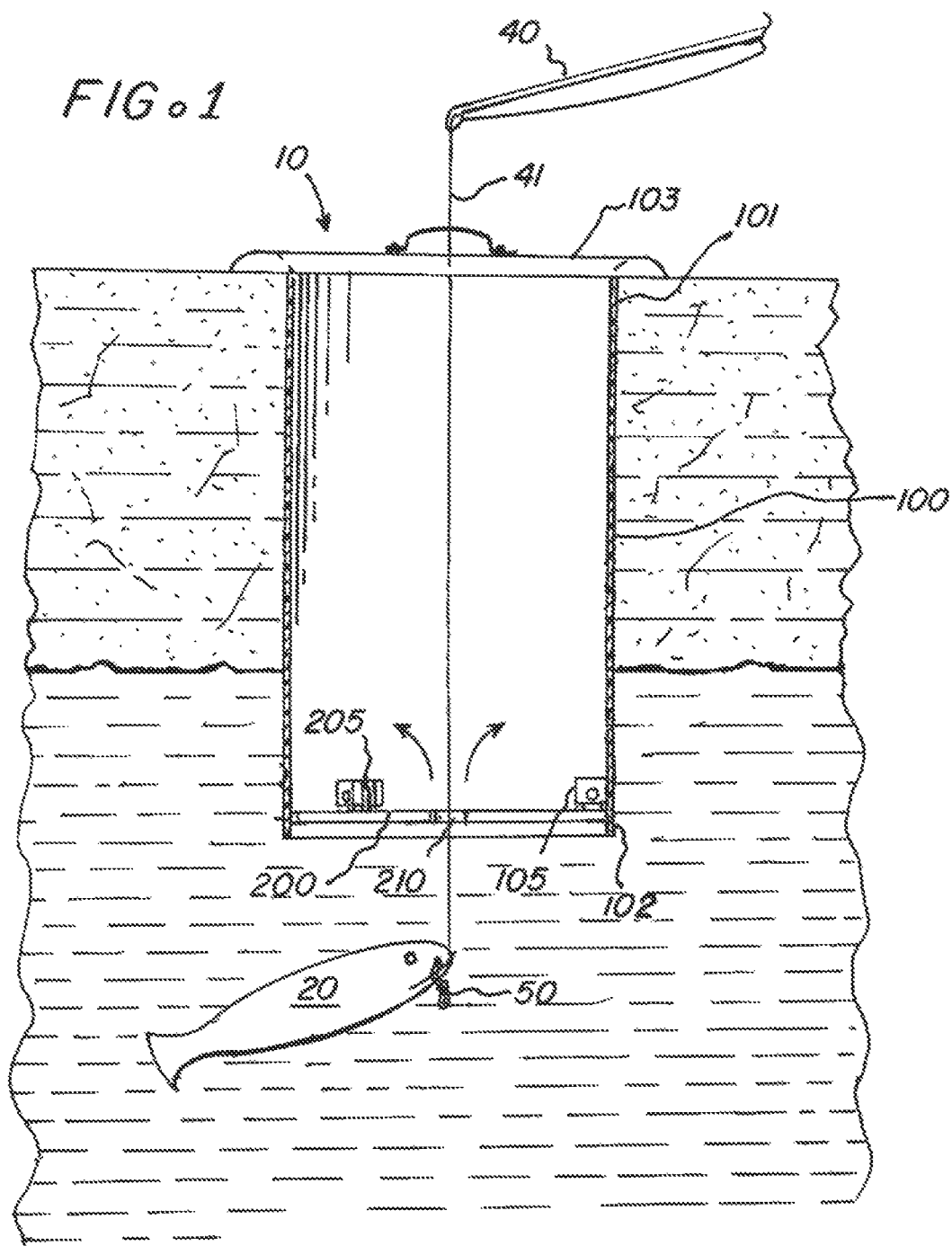
FIG. 1 is a side view of device, according to the present invention.
Figure 2:
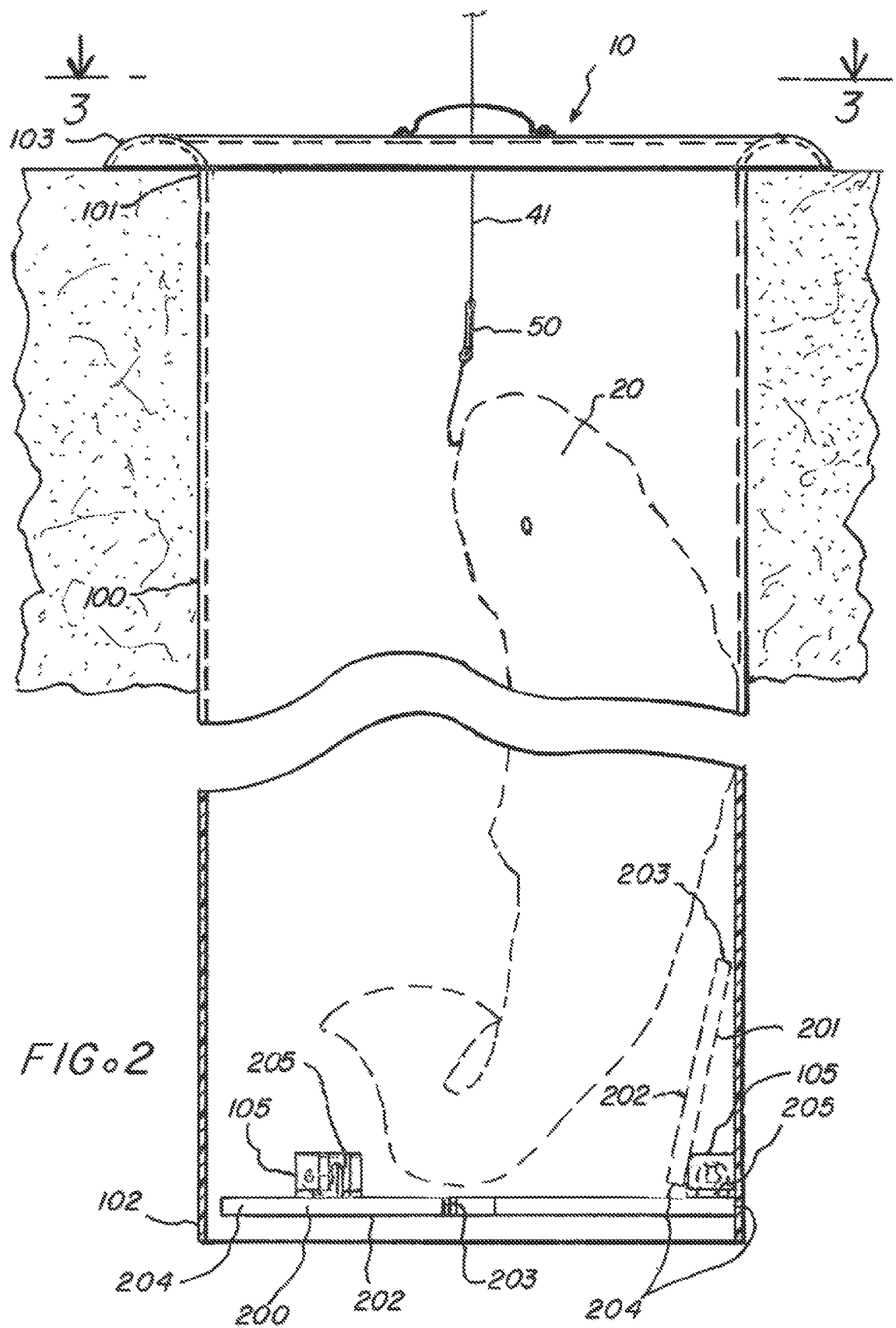
FIG. 2 is a side view of the device with a fish retained, according to the present invention.
Figure 3:
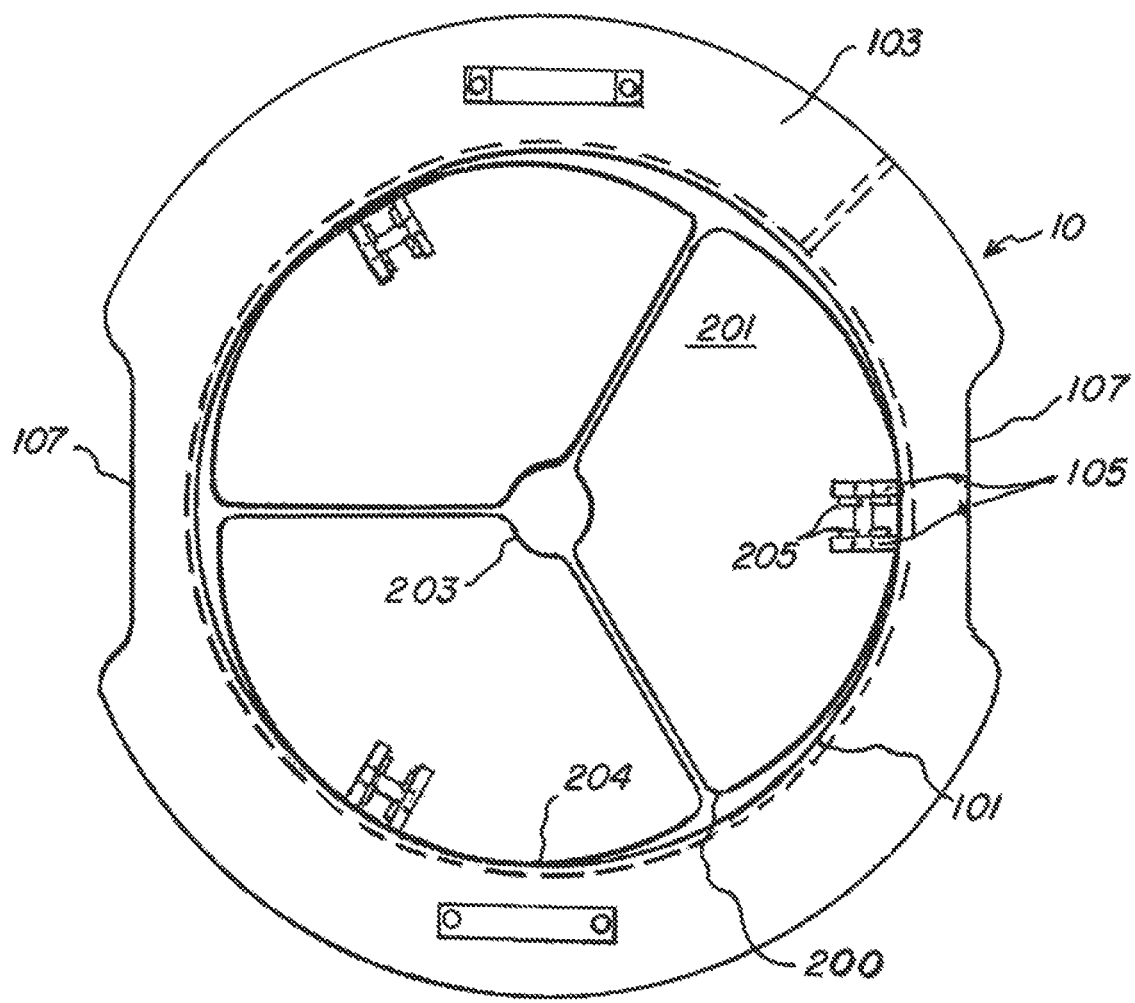
FIG. 3 is a top view of the device, according to the present invention.

Referring now to FIGS. 1-3 and FIGS. 5-7 there is shown an embodiment of the of a fish containment device for ice fishing, generally designated by the reference numeral 10. The fish containment device 10 includes a tubular sidewall 100 with a first diameter corresponding to the diameter of the the ice fishing hole and defining a cavity with an open top and an open bottom for slidable insertion into a hole for ice fishing. The tubular sidewall 100 has an upper end 101, a lower end 102, a flange 103, and a bracket 105. The flange 103 is fixed perpendicular to the upper end 101 and has a second diameter greater than the first diameter of the sidewall 100 to support the sidewall 100 upon insertion into the hole in the ice. The flange 103 includes a raised portion 107 to allow a user to easily grasp the flange and remove the device from the ice fishing hole.

The lower end 102 includes a plurality of brackets 105 equally spaced along the interior of the first diameter of the sidewall 100. The brackets 105 extend into the interior of the device and create a fixed point for the attachment of a plurality of flappers 200.

The plurality of flappers 200 have a top side 201, a bottom side 202, a fixed end 204, and a free end 203, the flappers 200 are in communication with the lower end 102 of the sidewall 100. The flappers 200 are identical in size and shape and in combination define a bottom portion with the free end 203 containing a notch to form a central lower aperture 210. The central lower aperture 210 is sized to a standard lure 50 and allows the lure 50 access through the device 10 and into the water. The top side 201 of the fixed end 204 includes a grasping member 205. The grasping member 205 attaches to the bracket 105 creating a hinge whereby the flapper 200 articulates upward with the free end 203 moving in an arc to the fixed end 204.

In the preferred embodiment of the present invention, the device 10 includes three flappers 200. According to this configuration, the flappers 200 equally distribute the weight of a trapped fish and are easily manipulated upward during the retrieval of a caught fish. It is preferred that the flappers 200 be of an identical, size, shape, and configuration to allow for easy replacement should a flapper 200 become damaged. Additionally, it is preferred that the flappers 200 are closely aligned with only a minimal gap between them so as to allow free movement upwards but restrict items from falling between them, wherein the only substantial opening in the bottom of the device will be the central lower aperture 210.

In the preferred embodiment of the present invention, the device 10 is constructed out of a molded plastic due to its resilience, durability, and cold temperature resistance. It is preferred that the bracket 105 be the only protrusion on the device 10 interior to prevent harm to the fish upon retrieval and to prevent the snagging of any fishing line 41 or fishing lures 50. Further, the tubular and material properties of the device act as an insulator for the ice hole preventing the hole from freezing during use.

In use, a user will place the device 10 into a pre drilled ice fishing hole. The user will then using their fishing pole 40 or a tip-up to lower their fishing line 41 and lure 50 through the central lower aperture 210 to attract a fish 20. Upon catching the fish 20 the user will pull the fish 20 up and into the hole. Upon entering the hole, the fish 20 will cause the flappers 200 to articulate upward. Upon clearing the flappers 200, the flappers 200 will lower and secure the holes opening, thereby preventing the fish 20 from reentering the water and retaining the fish 20 within the device 10. To retrieve the fish 20 the user may reach in and grab the fish 20 or easily remove the device 10 from the hole using the raised portion 207 of the flange 203.

Figure 4:
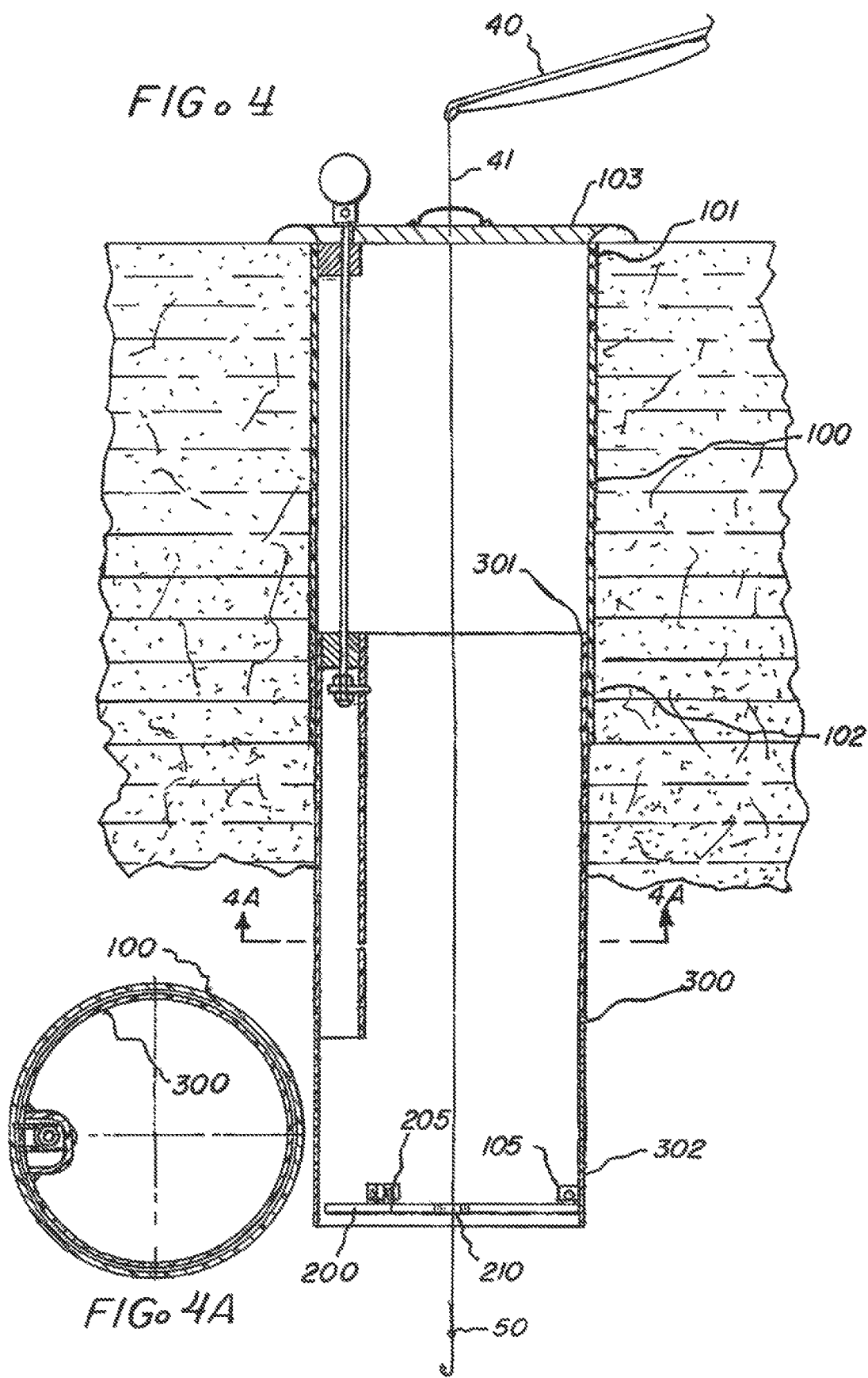
FIG. 4 is a side view of an additional embodiment of the device, according to the present invention.

Referring now to FIG. 4-FIG. 4A, an alternate embodiment of the device 10 includes a first tubular sidewall 100 with a diameter corresponding to the hole in the ice the device 10 is to be inserted. The first tubular sidewall 100 defines a cavity and has a first upper end 101 and a first lower end 102. The first upper end 101 contains a flange 103 with a diameter larger than the diameter of the first sidewall 100 to support the first sidewall 100 upon insertion into the hole in the ice. The flange 103 includes a raised portion to allow a user to grasp the flange 103 and remove the device 10 from the hole. A second tubular sidewall 300 is nestedly received within the first sidewall 100 and its depth relative to the flange 103 is adjustable. The second sidewall 300 has a second upper end 301 and a second lower end 302. The second upper end 301 is secured to the first lower end 102 at a desired depth using a securing means. The securing means may be a raised detent, friction tensioner, tab, or other similar securing means.

The second lower end 302 includes a plurality of brackets 105 on the interior of the second sidewall 300. A plurality of flappers 200 with a top side, a bottom side, a fixed end, and a free end are in communication with the lower end 302 of the second sidewall 300. The top side of the fixed end includes a grasping member 205. The grasping member 205 attaches to the bracket 105 and creates a hinge, wherein the flapper 200 articulates upward with the free end moving in an arc to the fixed end. The flappers 200 together define a bottom portion with a central lower aperture 210.

Usage of this embodiment is similar to the other embodiments with the exception of adjusting the depth of the device

10. When using this second embodiment, a user will first select length of the device 10 by moving the second sidewall 300 to the desired depth and then inserting the device 10 into the hole for ice fishing.

The invention claimed is:

1. An ice fishing containment device comprising:
   a tubular sidewall defining a cavity, the sidewall having a open top and a open bottom for insertion into an ice fishing hole;
   the sidewall having a upper end, a lower end, a interior, a exterior, and a first diameter, the lower end having a bracket extending into the interior;
   a flange, the flange connected to the upper end and having a planner surface extending perpendicular to the side wall, the flange having a second diameter, the second diameter greater than the first diameter; and
   a plurality of flappers, the flappers identically shaped and having a fixed end, a free end, a top side, and a bottom side, the flappers arranged to enclose the open bottom, the top side of the fixed end having a grasping member, the grasping member removably and hingedly attached to the bracket for movement upwards upon a force to the bottom side, the free ends shaped to create a central aperture, the central aperture allowing access to the water below.

2. An ice fishing containment device as in claim 1, wherein there are three flappers.

3. An fishing containment device as in claim 1, wherein the sidewall, flange, and bracket are one continuous piece of molded plastic.

4. An fishing containment device as in claim 1, wherein the first diameter is a diameter between 8 inches and 12 inches.

5. An ice fishing containment device comprising:
   a first tubular sidewall defining a cavity, the sidewall having a open top and a open bottom for insertion into an ice fishing hole;
   the sidewall having a upper end, a lower end, a interior, a exterior, and a first diameter;
   a second tubular sidewall nestedly received with the first tubular sidewall, the second tubular wall defining a cavity and having a open top and open bottom, the second tubular sidewall having a second upper end, a second lower end, a second interior, a second exterior, and a second diameter, the second lower end having a bracket extending into the second interior;
   a flange, the flange connected to the upper end and having a planner surface extending perpendicular to the first side wall, the flange having a third diameter, the third diameter greater than the first diameter; and
   a plurality of flappers, the flappers identically shaped and having a fixed end, a free end, a top side, and a bottom side, the flappers arranged to enclose the open bottom, the top side of the fixed end having a grasping member, the grasping member removably and hingedly attached to the bracket for movement upwards upon a force to the bottom side, the free ends shaped to create a central aperture, the central aperture allowing access to the water below.

6. An ice fishing containment device as in claim 4, wherein there are three flappers.

7. An fishing containment device as in claim 5, wherein the first diameter is a diameter between 8 inches and 12 inches.

* * * * *